United States Patent [19]
Pan

[11] Patent Number: 5,492,350
[45] Date of Patent: Feb. 20, 1996

[54] FOLDABLE FRAME MEMBER FOR A FOLDABLE BICYCLE

[75] Inventor: Jui-Tang Pan, Hua-Lien Hsien, Taiwan

[73] Assignee: Jacpro Industrial Co., Ltd., Taipei Hsien, Taiwan

[21] Appl. No.: 351,088

[22] Filed: Nov. 30, 1994

[51] Int. Cl.⁶ .................................................. B62K 15/00
[52] U.S. Cl. .................... 280/278; 74/551.1; 74/551.3; 280/287; 403/322
[58] Field of Search ................................. 280/278, 287; 403/322; 74/551.3, 551.1

[56] References Cited

U.S. PATENT DOCUMENTS

| | | | |
|---|---|---|---|
| 4,911,458 | 3/1990 | Lin et al. | 280/287 |
| 5,301,972 | 4/1994 | Lee | 403/322 |
| 5,337,609 | 8/1994 | Hsu | 74/551.3 |
| 5,440,948 | 8/1995 | Cheng | 280/278 |

Primary Examiner—Mitchell J. Hill
Attorney, Agent, or Firm—Finnegan, Henderson, Farabow, Garrett & Dunner

[57] ABSTRACT

A foldable bicycle frame member includes first and second shafts connected pivotally at one end and a locking unit for retaining releasably the first and second shafts in a coaxial position. The locking unit includes a first locking arm having a first end connected pivotally to the second shaft, and a second locking arm having a first end connected pivotally to a second end of the first locking arm and a second end connected pivotally to the first shaft. The first and second locking arms are formed as elongated members that are generally U-shaped in cross section. A retaining pin extends through pivot holes formed in the first end of the second locking arm and into longitudinal slots formed in the second end of the first locking arm. The position of the retaining pin in the slots when the second locking arm is received in the first locking arm can be adjusted to adjust the force for retaining releasably the first and second shafts in the coaxial position.

10 Claims, 9 Drawing Sheets

FOLDABLE FRAME MEMBER FOR A FOLDABLE BICYCLE

BACKGROUND OF THE INVENTION

1. Field of the Invention

The invention relates to a foldable frame member for a foldable bicycle, more particularly to a foldable bicycle frame member with an improved locking unit.

2. Description of the Related Art

A conventional foldable bicycle (A), such as that shown in FIG. 1, comprises several foldable frame members (A1, A2, A3) which permit folding of the bicycle (A) in order to facilitate storage and transport of the latter when not in use.

An example of a conventional foldable frame member (A1) for the foldable bicycle (A) is shown in FIG. 2. The frame member (A1) is shown to comprise first and second shafts 11, 12, a hinge connector 10 for connecting pivotally the first and second shafts 11, 12 at one end, and a locking unit (B) for retaining releasably the first and second shafts 11, 12 in a coaxial position. The first shaft 11 is to be connected to a bicycle handlebar, while the second shaft 12 is to be connected to a front bicycle fork. The hinge connector 10 includes a first leaf member 100 connected securely to one end of the first shaft 11, a second leaf member 101 connected securely to one end of the second shaft 12, and a hinge pin 102 which connects pivotally first ends of the first and second leaf members 100, 101. The first and second leaf members 100, 101 are preferably welded to the respective one of the first and second shafts 11, 12 and further have second ends provided respectively with a pair of pivot ears 1001, 1011.

Referring to FIGS. 2 and 3, the locking unit (B) comprises a first locking arm 13, an adjustable second locking arm 14, a retaining pin 15, and first and second pivot pins 16, 17. The first locking arm 13 is formed as an elongated member that is generally U-shaped in cross section and that has first and second ends 131, 132 formed respectively with a pair of transverse pivot holes 1310, 1320. The first pivot pin 16 extends through the pivot holes 1310 and the pivot ears 1011 at the second end of the second leaf member 101 to connect pivotally the first end 131 of the first locking arm 13 to the second shaft 12. The second locking arm 14 is formed as a solid rod with a threaded first end 141 and a second end 142 opposite to the first end 141. The retaining pin 15 has a shank portion 151 which extends through the pivot holes 1320 and which is formed with a radial threaded bore 152 that engages the threaded first end 141 of the second locking arm 14, thereby mounting pivotally the first end 141 of the second locking arm 14 to the second end 132 of the first locking arm 13. The second locking arm 14 is shorter and narrower than the first locking arm 13. Thus, the second locking arm 14 can be received in the first locking arm 13 when the first locking arm 13 is pivoted toward the first shaft 11 to retain releasably the first and second shafts 11, 12 in the coaxial position. The second pivot pin 17 is formed with a radial hole 171 that permits extension of the second end 142 of the second locking arm 14 therethrough. A C-shaped locking ring 172 engages the second end 142 of the second locking arm 14 to prevent removal thereof from the second pivot pin 17. The second pivot pin 17 extends through the pivot ears 1001 at the second end of the first leaf member 100 to connect pivotally the second end 142 of the second locking arm 14 to the first shaft 11.

FIG. 2 illustrates the foldable frame member (A1) when in a folded position. To unfold the frame member (A1), the first and second shafts 11, 12 are pivoted to the coaxial position, as shown in FIG. 4. The first locking arm 13 is then pivoted toward the first shaft 11. At this time, the retaining pin 15 is now closer to the first shaft 11 than the second pivot pin 17, and the distance between the retaining pin 15 and the first pivot pin 16 becomes smaller, thereby forcing the first shaft 11 toward the second shaft 12 to achieve a tight locking effect. The force for retaining releasably the first and second shafts 11, 12 in the coaxial position can be adjusted by rotating the second locking arm 14 with the use of a wrench in order to adjust the distance between the retaining pin 15 and the second pivot pin 17, a tighter locking effect being achieved when this distance is reduced.

It is noted that the second locking arm 14 not only serves as a force bearing member but also as an adjustment member. Since the structural strength of the second locking arm 14, which is formed as an elongated solid rod, is weaker than that of the first locking arm 13, which is formed as an elongated member that is generally U-shaped in cross section, and since the two ends 141, 142 of the second locking arm 14 are thinner in order to engage the retaining pin 15 and the second pivot pin 17, the second locking arm 14 is likely to break when a bicycle which employs the foldable frame member (A1) is in use, thereby endangering the user.

SUMMARY OF THE INVENTION

Therefore, the object of the present invention is to provide a foldable bicycle frame member with an improved locking unit that is more durable than that of the prior art.

Accordingly, the foldable bicycle frame member of this invention includes first and second shafts connected pivotally at one end and a locking unit for retaining releasably the first and second shafts in a coaxial position. The locking unit comprises a first locking arm having a first end connected pivotally to one end of the second shaft and a second end, and a second locking arm having a first end connected pivotally to the second end of the first locking arm and a second end connected pivotally to one end of the first shaft.

The first locking arm is formed as an elongated member that is generally U-shaped in cross section, and includes a base plate and two side plates which extend from the base plate. The side plates are formed with aligned longitudinally extending slots at the second end of the first locking arm.

The second locking arm is formed as an elongated member that is generally U-shaped in cross section, and includes a base plate and two side plates which extend from the base plate. The side plates are formed with aligned pivot holes at the first end of the second locking arm. The second locking arm is shorter and narrower than the first locking arm so that the second locking arm can be received in the first locking arm when the first locking arm is pivoted toward the first shaft to retain releasably the first and second shafts in the coaxial position.

The locking unit further comprises a retaining pin extending through the pivot holes in the side plates of the second locking arm and into the slots in the side plates of the first locking arm to mount pivotally the first end of the second locking arm to the second end of the first locking arm, and limit means associated with the retaining pin for limiting adjustably position of the retaining pin in the slots in the side plates of the first locking arm when the second locking arm is received in the first locking arm to adjust force for retaining releasably the first and second shafts in the coaxial position.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 1:
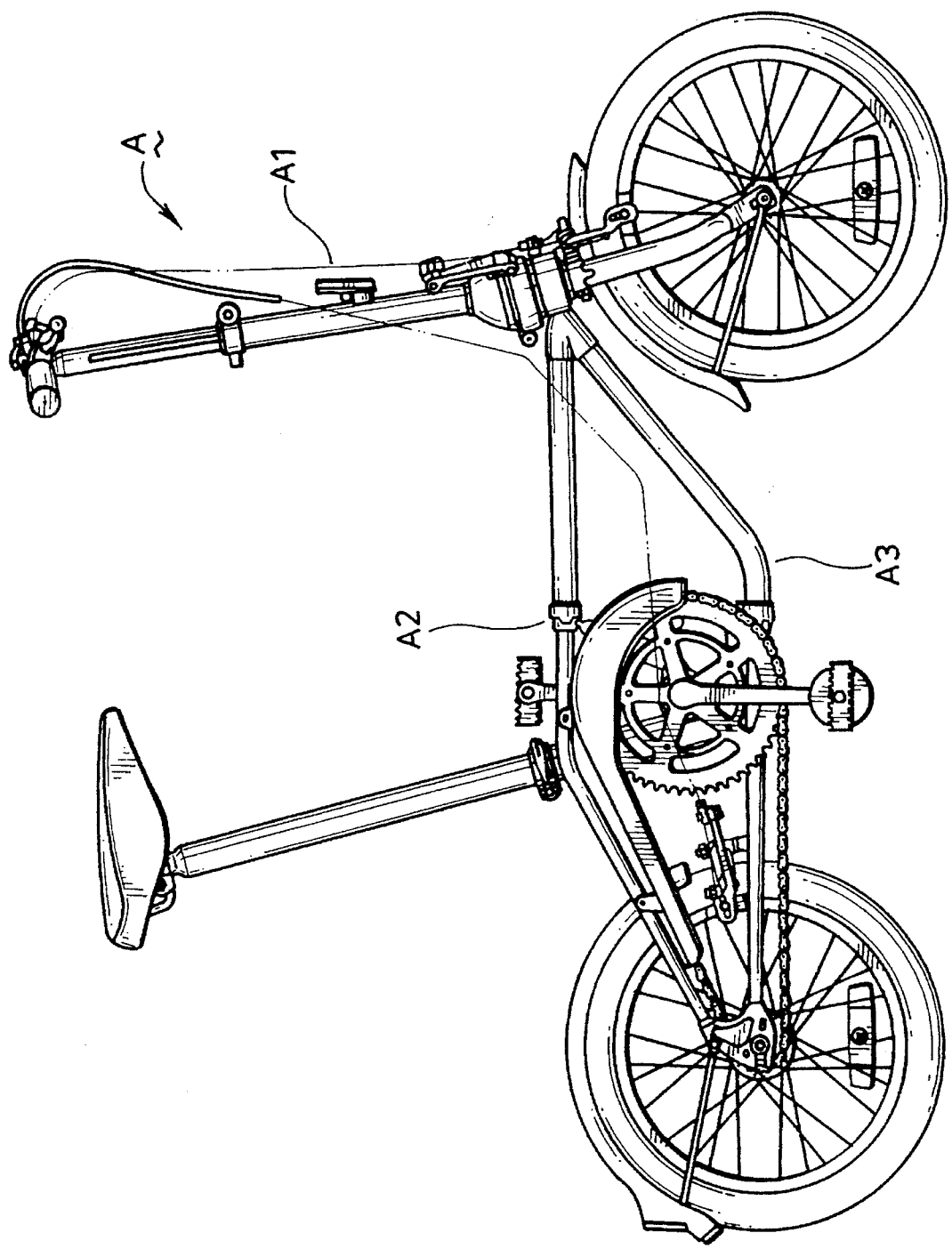
FIG. 1 is a schematic view of a conventional foldable bicycle.
Figure 2:
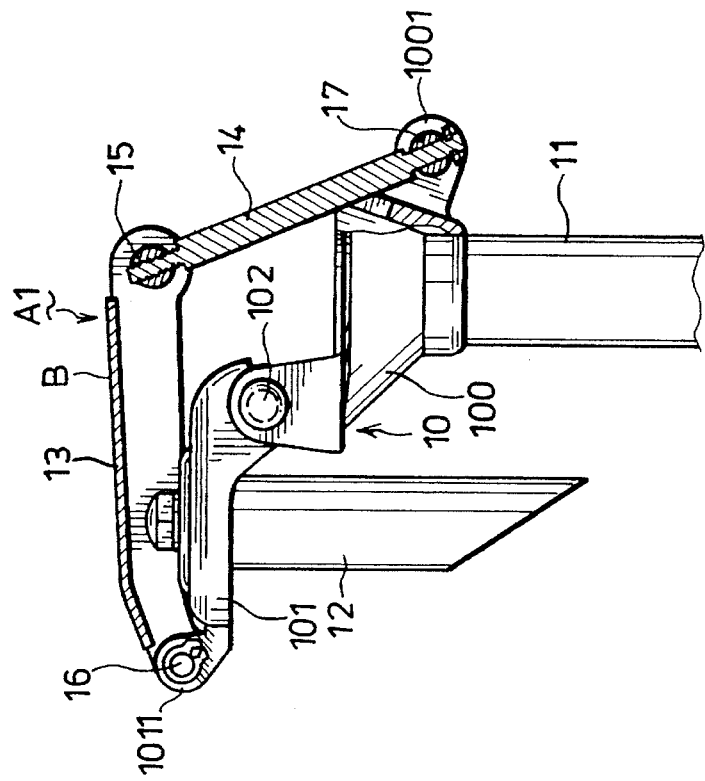
FIG. 2 illustrates a conventional foldable frame member of the foldable bicycle when in a folded position.
Figure 3:
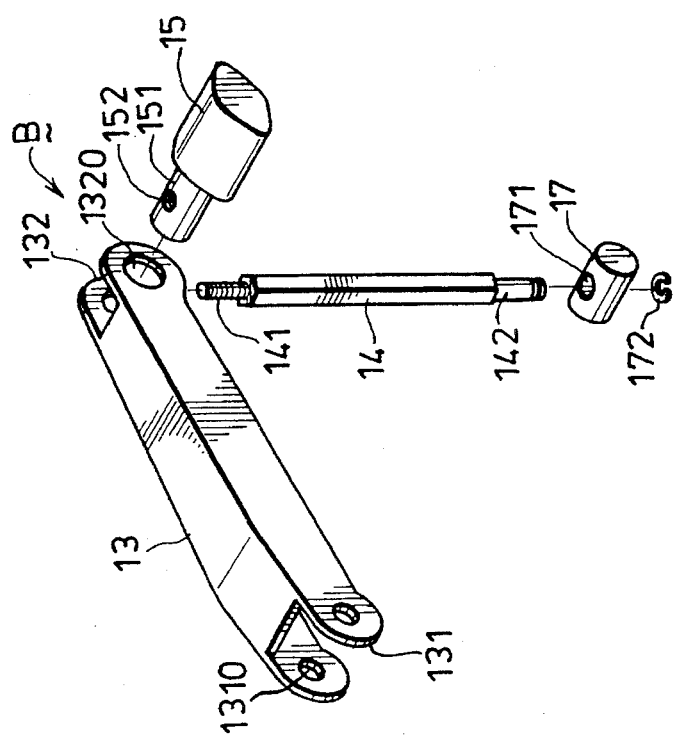
FIG. 3 is an exploded view of a locking unit of the conventional foldable bicycle frame member shown in FIG. 2.

Before the present invention is described in greater detail, it should be noted that like elements are indicated by the same reference numerals throughout the specification.

Figure 5:
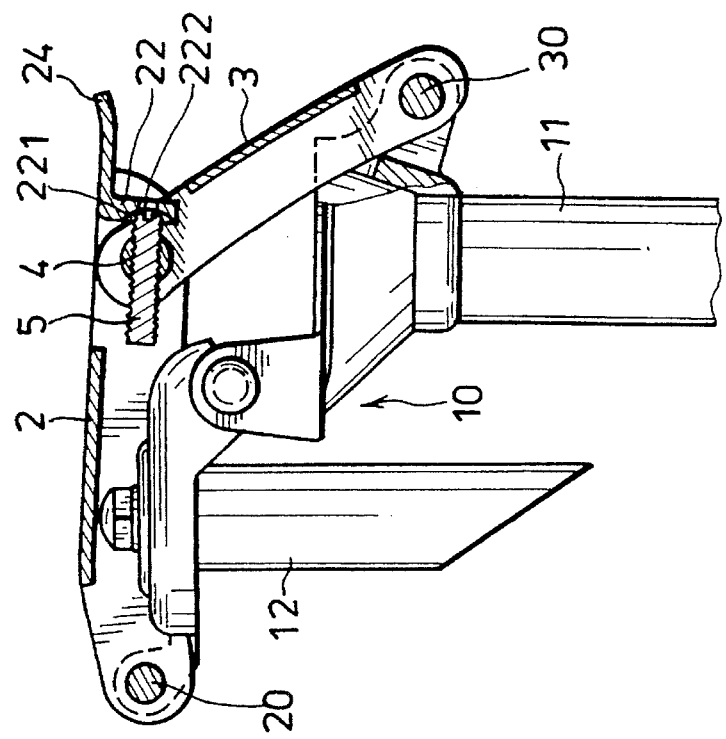
FIG. 5 illustrates the first preferred embodiment of a foldable bicycle frame member according to the present invention when in a folded position.
Figure 4:
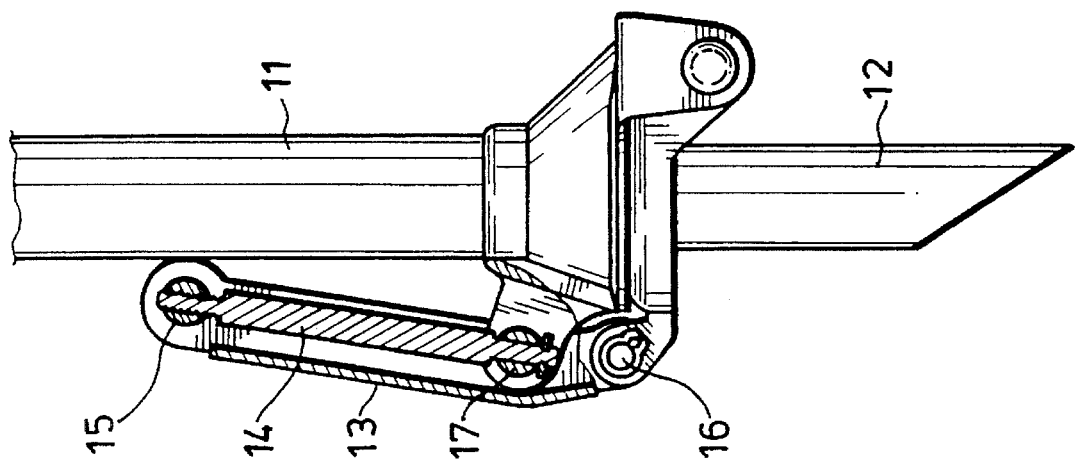
FIG. 4 illustrates the conventional foldable bicycle frame member when in an unfolded position.

Referring to FIG. 5, which illustrates the first preferred embodiment of a foldable bicycle frame member according to the present invention when in a folded position, the first preferred embodiment is shown to comprise first and second shafts 11, 12, a hinge connector 10 for connecting pivotally the first and second shafts 11, 12 at one end, and a locking unit for retaining releasably the first and second shafts 11, 12 in a coaxial position. The first preferred embodiment is generally similar to the foldable frame member (A1) described beforehand, the main difference residing in the construction of the locking unit.

Figure 6:
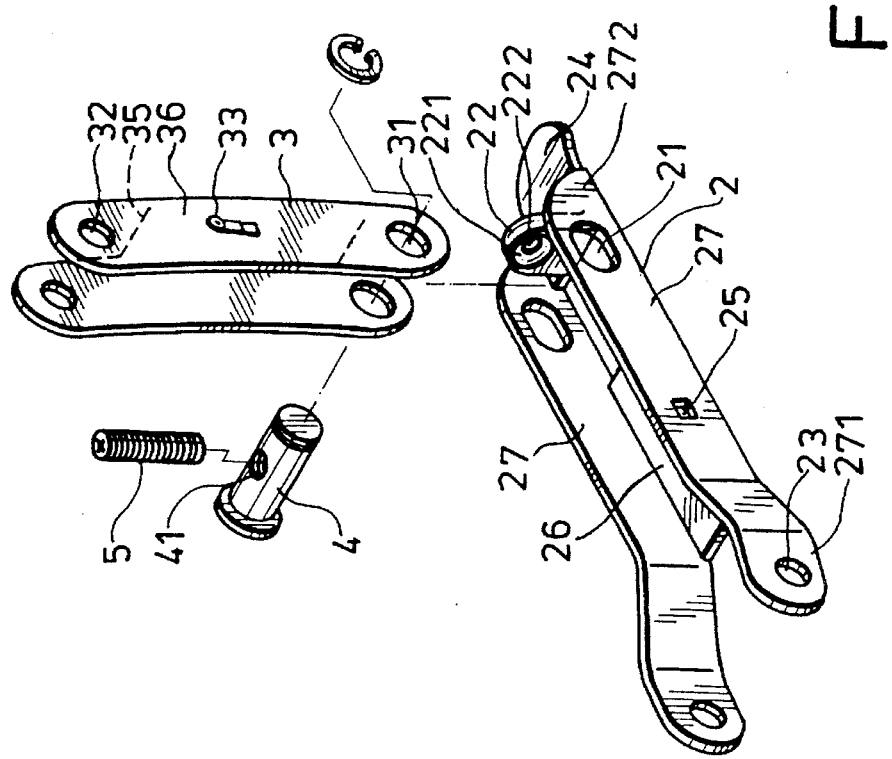
FIG. 6 is an exploded view of a locking unit of the first preferred embodiment.

Referring to FIGS. 5 and 6, the locking unit of the first preferred embodiment comprises a first locking arm 2, a second locking arm 3, a retaining pin 4, a threaded rod 5 and first and second pivot pins 20, 30.

The first locking arm 2 is formed as an elongated member that is generally U-shaped in cross section. The first locking arm 2 includes a base plate 26 and two side plates 27 which extend from the base plate 26. The side plates 27 are formed with aligned pivot holes 23 at a first end 271 and are further formed with aligned longitudinally extending slots 21 at a second end 272. A positioning plate 22 extends from the base plate 26 adjacent to and between the second ends 272 of the side plates 27. The positioning plate 22 is disposed adjacent to one side of the slots 21 opposite to the first end 271 and has a wall surface which faces the first end and which is formed with a positioning recess 221. The positioning plate 22 is further formed with an access hole 222 to permit access to the positioning recess 221 via an opposite wall surface of the positioning plate 22. The first pivot pin 20 extends through the pivot holes 23 to connect pivotally the first ends 271 of the side plates 27 to one end of the second shaft 12 in a known manner. The base plate 26 further has a distal end portion that serves as a handle 24 adjacent to the positioning plate 22. One of the side plates 27 is formed with a fastening hole 25.

The second locking arm 3 is formed as an elongated member that is generally U-shaped in cross section. The second locking arm 3 includes a base plate 35 and two side plates 36 which extend from the base plate 35. The side plates 36 are formed with aligned pivot holes 31, 32 at first and second ends thereof. The second pivot pin 30 extends through the pivot holes 32 to connect pivotally the second ends of the side plates 36 to one end of the first shaft 11 in a known manner. One of the side plates 36 has a resilient fastener 33 mounted thereat.

The retaining pin 4 extends through the pivot holes 31 and into the slots 21, thereby mounting pivotally the first ends of the side plates 36 to the second ends 272 of the side plates 27. In this embodiment, the retaining pin 4 is formed with a radial threaded bore 41.

Note that the second locking arm 3 should be shorter and narrower than the first locking arm 2 so that the second locking arm 3 can be received in the first locking arm 2 when the first locking arm 2 is pivoted toward the first Shaft 11 to retain releasably the first and second shafts 11, 12 in the coaxial position. The fastener 33 engages the fastening hole 25 when the second locking arm 3 is received in the first locking arm 2.

The threaded rod 5 engages threadedly the threaded bore 41 and has a head portion which abuts the positioning plate 22 at the positioning recess 221. In this embodiment, the positioning plate 22, the threaded bore 41 in the retaining pin 4 and the threaded rod 5 constitute a limit means which limits adjustably the position of the retaining pin 4 in the slots 21 when the second locking arm 3 is received in the first locking arm 2 to adjust the force for retaining releasably the first and second shafts 11, 12 in the coaxial position, as will be described hereinafter.

Figure 7:
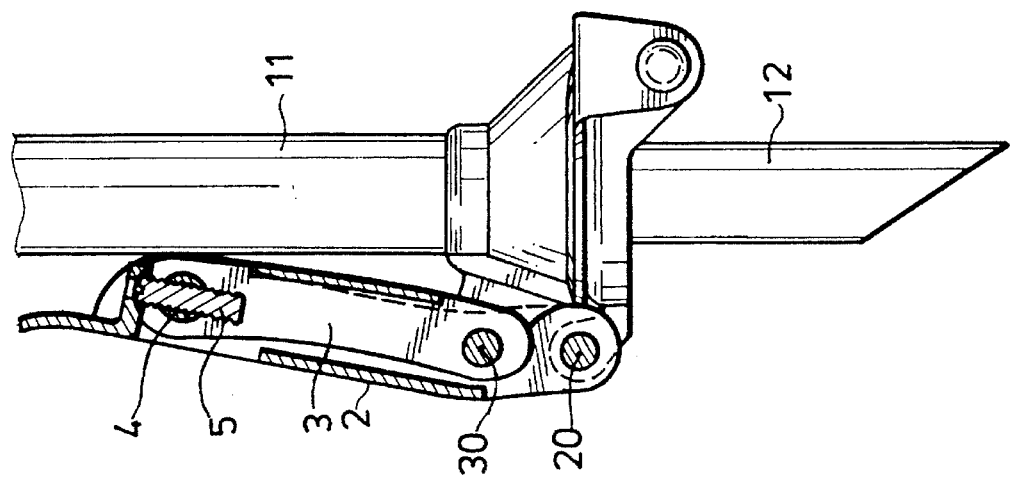
FIG. 7 illustrates the first preferred embodiment when in an unfolded position.

To unfold the first preferred embodiment, the first and second shafts 11, 12 are pivoted to the coaxial position, as shown in FIG. 7. The first locking arm 2 is then pivoted toward the first shaft 11. At this time, the retaining pin 4 is now closer to the first shaft 11 than the second pivot pin 30, and the distance between the retaining pin 4 and the first pivot pin 20 becomes smaller, thereby forcing the first shaft 11 toward the second shaft 12 to achieve a tight locking effect. The fastener 33 engages the fastening hole 25 at this stage to retain releasably the second locking arm 3 in the first locking arm 2.

Figure 8:
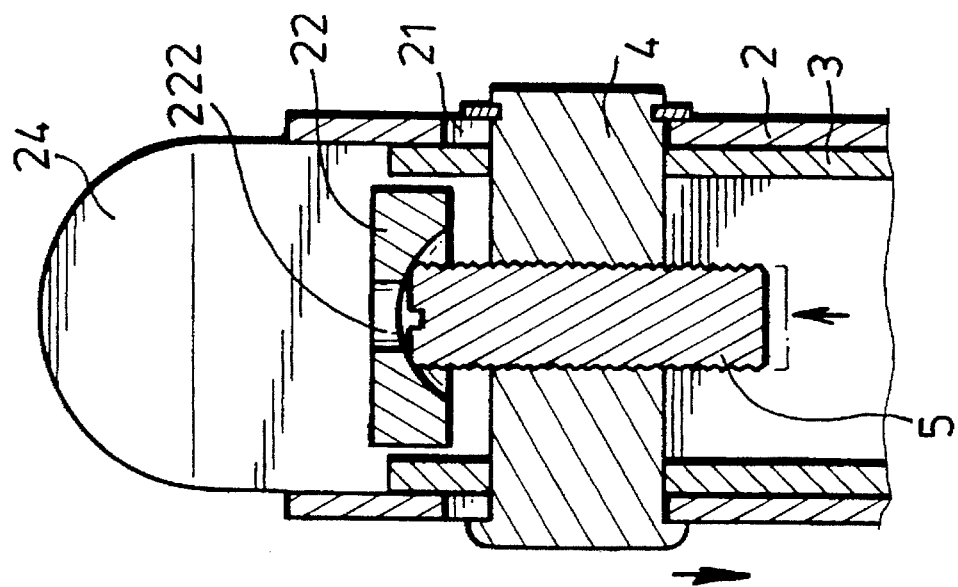
FIG. 8 is an enlarged, partly sectional view which illustrates the connection among first and second locking arms and a retaining pin of the locking unit of the first preferred embodiment.

Referring to FIG. 8, when the threaded rod 5 is rotated so as to move the retaining pin 4 along the slots 21 in a direction toward the first pivot pin 20, as indicated by the arrows, the force for retaining the first and second shafts 11, 12 in the coaxial position is increased. Accordingly, this force is decreased when the threaded rod 5 is rotated so as to move the retaining pin 4 along the slots 21 in a direction away from the first pivot pin 20.

Note that a separate element, i.e. the threaded rod 5, is employed when adjusting the retaining force of the locking unit. In addition, the second locking arm 3 only serves as a force bearing member and has a structural strength similar to that of the first locking arm 2 due to similarities in their configurations. Thus, the second locking arm 3 is more durable than that employed in the previously described locking unit (B) of the conventional foldable bicycle frame member (A1).

Figure 9:
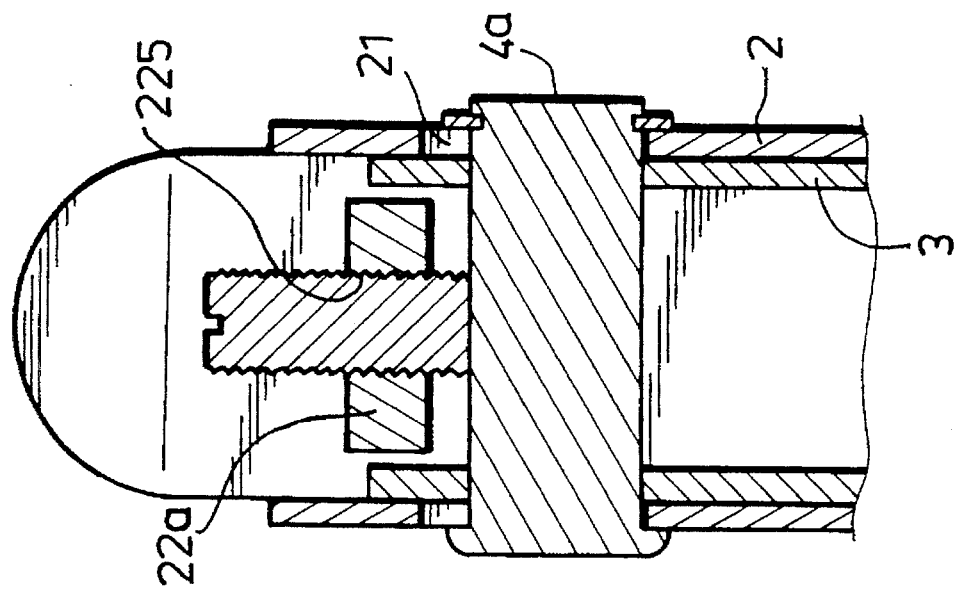
FIG. 9 is an enlarged, partly sectional view which illustrates the connection among first and second locking arms and a retaining pin of the locking unit of the second preferred embodiment of a foldable bicycle frame member according to the present invention.

FIG. 9 illustrates the connection among first and second locking arms 2, 3 and a retaining pin 4a of the locking unit of the second preferred embodiment of a foldable bicycle frame member according to the present invention. Unlike the first preferred embodiment, the retaining pin 4a is not formed with a threaded bore for engaging threadedly the threaded rod 5. Instead, the threaded rod 5 engages a threaded hole 225 formed in the positioning plate 22a of the first locking arm 2, and has a tip which abuts the retaining pin 4a. The operation and effect of the second preferred embodiment is similar to that of the first preferred embodiment and will not be detailed further.

Figure 11:
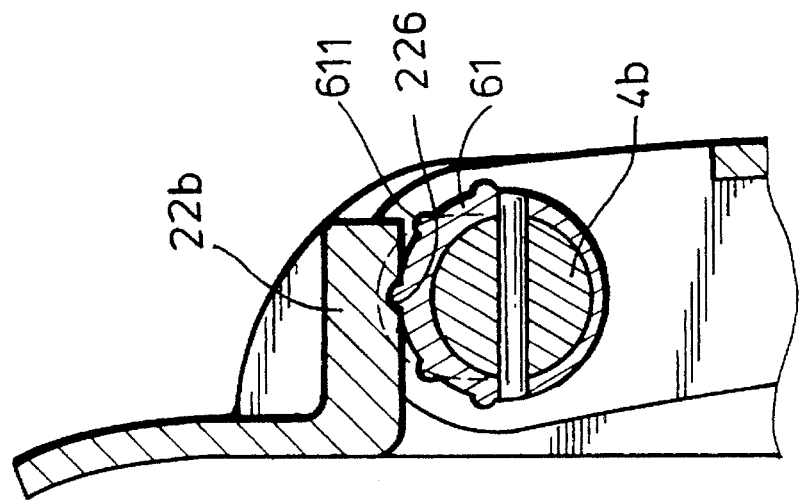
FIG. 11 is a sectional view of the locking unit of the third preferred embodiment, taken along line XI—XI in FIG. 10.
Figure 10:
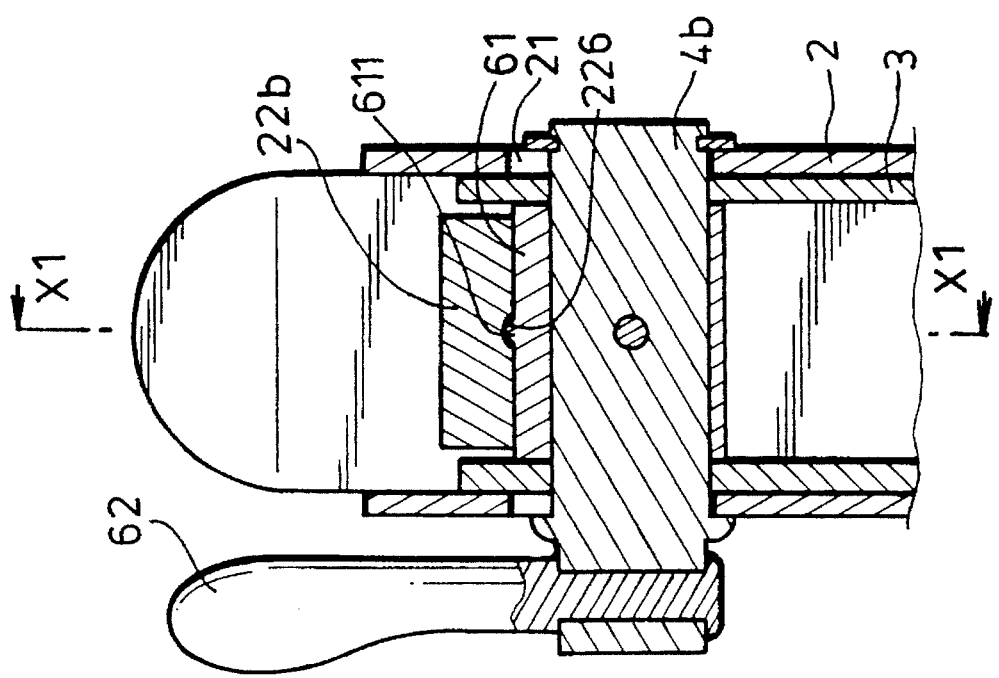
FIG. 10 is an enlarged, partly sectional view which illustrates the connection among first and second locking arms and a retaining pin of the locking unit of the third preferred embodiment of a foldable bicycle frame member according to the present invention.

FIGS. 10 and 11 illustrate the connection among first and second locking arms 2, 3 and a retaining pin 4b of the locking unit of the third preferred embodiment of a foldable bicycle frame member according to the present invention. Note that no threaded rod is employed in this embodiment. Instead, the retaining pin 4b has an eccentric ring 61 secured thereon and further has one end provided with a lever 62 for rotating the retaining pin 4b. The eccentric ring 61 has an outer periphery formed with a plurality of angularly spaced convex protrusions 611. The positioning plate 22b of the first locking arm 2 is formed with a concave recess 226 that engages releasably a selected one of the convex protrusions 611. Thus, when the lever 62 is operated so that the positioning plate 22b engages a selected one of the convex protrusions 611, the position of the retaining pin 4b in the slots 21 is adjusted to adjust correspondingly the retaining force of the locking unit.

Figure 12:
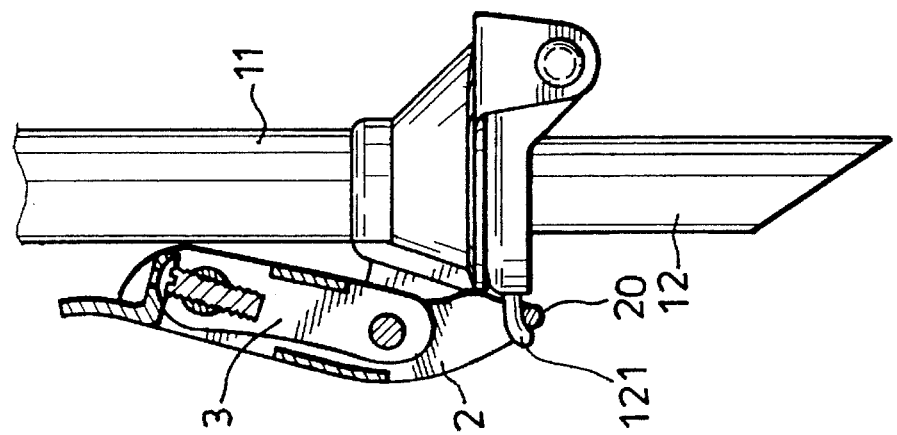
FIG. 12 illustrates the fourth preferred embodiment of a foldable bicycle frame member according to the present invention when in an unfolded position.

FIG. 12 illustrates the fourth preferred embodiment of a foldable bicycle frame member according to the present invention. In this embodiment, the first locking arm 2 is connected removably to the second shaft 12. Instead of being formed with a pair of pivot ears, the second end of the leaf member on one end of the second shaft 12 is formed with a hook projection 121 which engages pivotally and releasably the first pivot pin 20 between the first ends of the side plates of the first locking arm 2. Such an arrangement permits the first and second locking arms 2, 3 of this embodiment to be shorter than those of the previous embodiments. The operation of the fourth preferred embodiment is similar to that of the previous embodiments and will not be detailed further.

Figure 13:
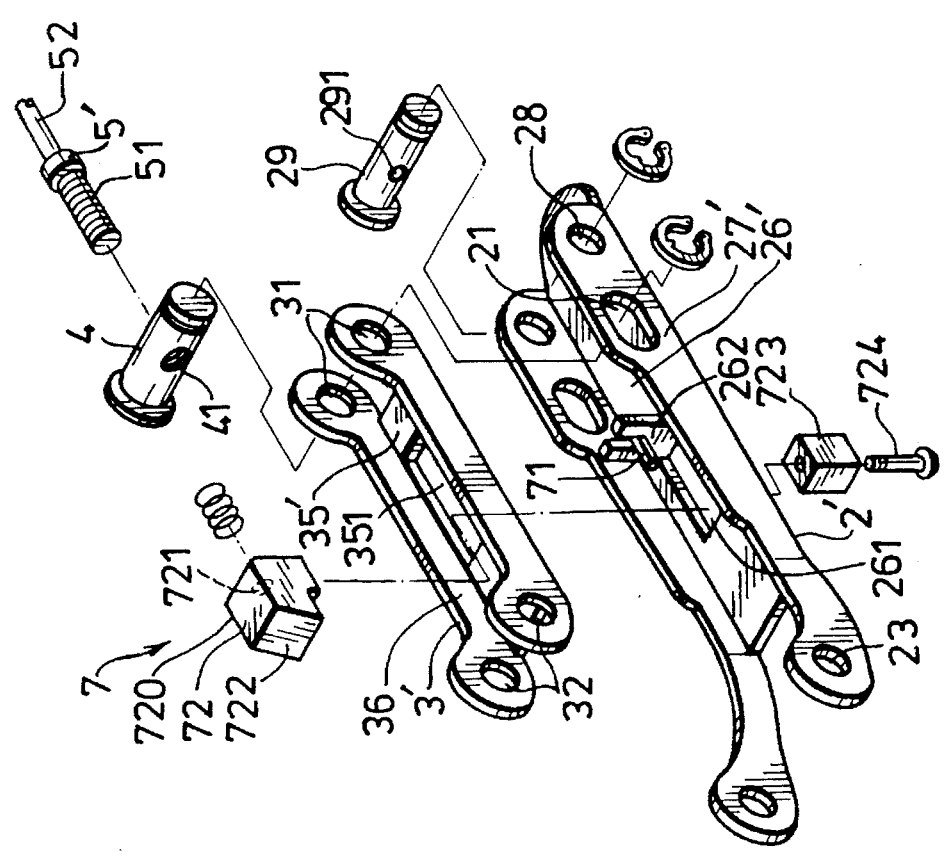
FIG. 13 is an exploded view of a locking unit of the fifth preferred embodiment of a foldable bicycle frame member according to the present invention.

FIG. 13 shows the locking unit of the fifth preferred embodiment of a foldable bicycle frame member according to the present invention. As illustrated, the locking unit has a limit means for limiting adjustably the position of the retaining pin 4 in the slots 21 when the second locking arm 3' is received in the first locking arm 2' which comprises a support pin 29, a radial threaded bore 41 formed in the retaining pin 4, and a threaded rod 5'. The support pin 29 extends between and is mounted to the side plates 27' of the first locking arm 2' at the second end of the first locking arm 2'. The support pin 29 extends through pivot holes 28 disposed adjacent to one side of the slots 21 opposite to the first end of the first locking arm 2' and is formed with a radial hole 291. The threaded rod 5' has a threaded shank portion 51 that engages threadedly the threaded bore 41 in the retaining pin 4, and a diameter-reduced shaft portion 52 that extends through the radial hole 291 in the support pin 29. The shank portion 51 has one end which abuts the support pin 29. The distal end of the shaft portion 52 is adapted to engage one end of a screw driver to drive rotatably the threaded rod 5'. The threaded rod 5' is rotated to adjust the position of the retaining pin 4 in the slots 21.

The base plate 26' of the first locking arm 2' has an intermediate portion formed with a longitudinal guide hole 261. A positioning plate 262 extends from the base plate 26' at one end of the guide hole 261 and is disposed between the side plates 27' adjacent to the slots 21. A guide rod 71 projects from the positioning plate 262 and extends along the guide hole 261.

The base plate 35' of the second locking arm 3' is formed with a longitudinal engaging hole 351 that is aligned with the guide hole 261 when the second locking arm 3' is received in the first locking arm 2'.

The locking unit of this embodiment further comprises a spring-loaded fastening unit 7 which includes a fastening block 72 disposed movably in the guide hole 261 and a spring 73. The fastening block 72 has first and second block portions 720, 723 fastened together by a screw 724. The first block portion 720 is disposed adjacent to the positioning plate 262 and has one side formed with a blind hole 721 for receiving the guide rod 71, and an opposite side formed with an inclined face 722 which inclines by an angle of about 75°. The second block portion 723 is narrower than the first block portion 720 and extends through the guide hole 261. The spring 73 is sleeved on the guide rod 71 and is disposed between the fastening block 72 and the positioning plate 262 to bias the fastening block 72 away from the positioning plate 262.

Figure 14:
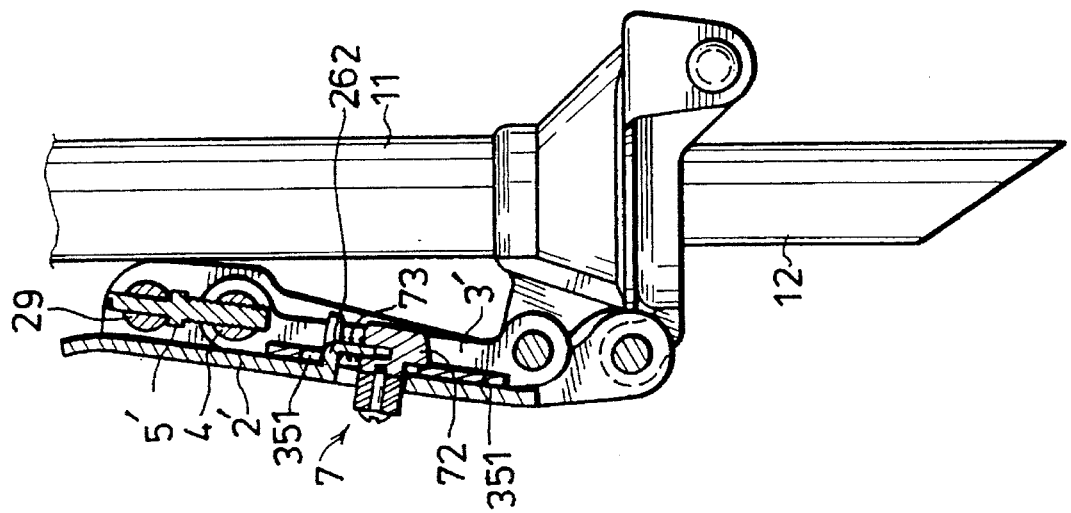
FIG. 14 illustrates the fifth preferred embodiment when in an unfolded position.
Figure 15:
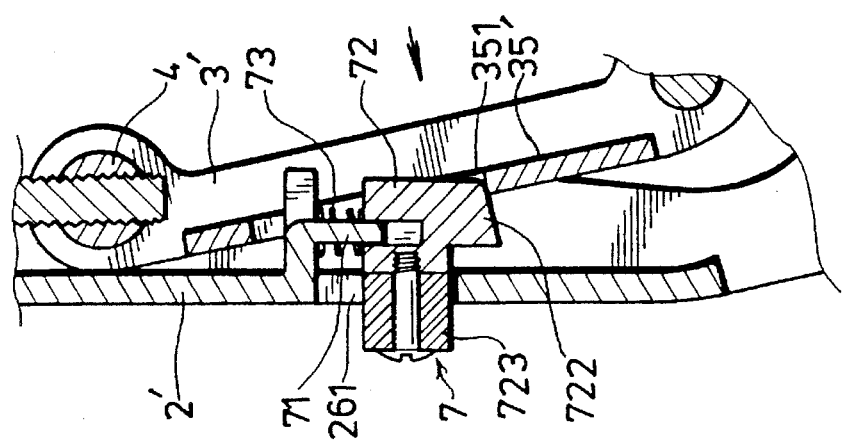
FIG. 15 is an enlarged, partly sectional view of the locking unit of the fifth preferred embodiment.

Referring to FIGS. 14 and 15, when the first locking arm 2' is pivoted toward the first shaft 11, the second locking arm 3' pivots toward the first locking arm 2', as indicated by the arrow in FIG. 15 At this time, a portion of the base plate 35' which defines the engaging hole 351 abuts the inclined face 722. Further pivoting movement of the second locking arm 3' in this direction forces the fastening block 72 toward the positioning plate 262. When base plate 35' ceases to abut the inclined face 722, the spring 73 expands to return the fastening block 72 to its former position. The bottom face of the first block portion 720 engages the base plate 35' to retain releasably the second locking arm 3' in the first locking arm 2'.

To release the locking unit from the locked state, the fastening block 72 is simply pushed toward the positioning plate 262 to disengage the second locking arm 3'. The first locking arm 2' can then be pivoted away from the first shaft 11.

Figure 16:
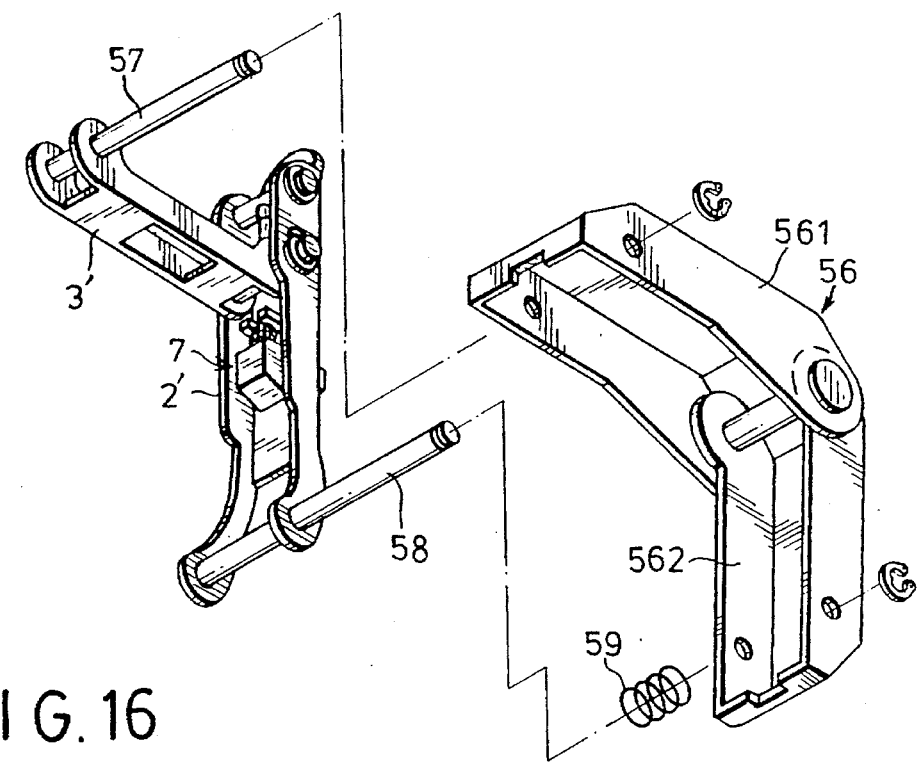
FIG. 16 illustrates a hinge connector and a locking unit of the sixth preferred embodiment of a foldable bicycle frame member according to the present invention.
Figure 17:
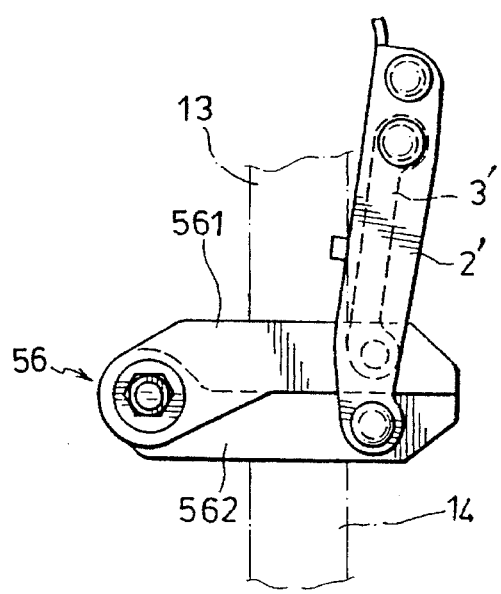
FIG. 17 is a schematic view of the sixth preferred embodiment when in an unfolded position.

FIGS. 16 and 17 illustrate the sixth preferred embodiment of a foldable bicycle frame member according to the present invention. In this embodiment, the frame member serves as a crossbar of a foldable bicycle. The leaf members 561, 562 of a hinge connector 56 cooperatively form a box-like structure and are welded respectively to one end of first and second shafts 13, 14 of the frame member. First and second pivot pins 57, 58 connect pivotally and respectively one end of the first and second locking arms 2', 3' of a locking unit and the leaf members 561, 562 of the hinge connector 56. A spring 59 is preferably sleeved on at least one of the first and second pivot pins 57, 58 to bias the first and second locking arms 2', 3' away from the leaf members 561, 562.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A foldable frame member for a foldable bicycle, said foldable frame member including first and second shafts connected pivotally at one end and a locking unit for retaining releasably said first and second shafts in a coaxial position, said locking unit comprising a first locking arm having a first end connected pivotally to said one end of said second shaft and a second end, and a second locking arm having a first end connected pivotally to said second end of said first locking arm and a second end connected pivotally to said one end of said first shaft, wherein:

said first locking arm is formed as an elongated member that is generally U-shaped in cross section, said first locking arm including a base plate and two side plates which extend from said base plate, said side plates being formed with aligned longitudinally extending slots at said second end of said first locking arm;

said second locking arm is formed as an elongated member that is generally U-shaped in cross section, said second locking arm including a base plate and two side plates which extend from said base plate, said side plates being formed with aligned pivot holes at said first end of said second locking arm, said second locking arm being shorter and narrower than said first looking arm so that said second locking arm can be received in said first locking arm when said first locking arm is pivoted toward said first shaft to retain releasably said first and second shafts in the coaxial position; and said locking unit further comprises a retaining pin extending through said pivot holes in said side plates of said second locking arm and into said slots in said side plates of said first locking arm to mount pivotally said first end of said second locking arm to said second end of said first locking arm; and limit means associated with said retaining pin for limiting adjustably position of said retaining pin in said slots in said side plates of said first locking arm when said second locking arm is received in said first locking arm to adjust force for retaining releasably said first and second shafts in the coaxial position.

2. The foldable frame member as claimed in claim 1, wherein one of said side plates of said first locking arm is formed with a fastening hole, and one of said side plates of said second locking arm has a resilient fastener mounted thereat, said resilient fastener engaging said fastening hole when said second locking arm is received in said first locking arm.

3. The foldable frame member as claimed in claim 1, wherein said limit means comprises:

a positioning plate extending from said base plate of said first locking arm between said side plates at said second end of said first locking arm, said positioning plate being disposed adjacent to one side of said slots in said side plates of said first locking arm opposite to said first end of said first locking arm and having a wall surface which faces said first end of said first locking arm and which is formed with a positioning recess, said positioning plate further having an access hole formed therethrough to permit access to said positioning recess via an opposite wall surface of said positioning plate;

a radial threaded bore formed in said retaining pin; and a threaded rod engaging threadedly said threaded bore and having a head portion which abuts said positioning plate at said positioning recess, said threaded rod being rotatable to adjust the position of said retaining pin in said slots in said side plates of said first locking arm when said second locking arm is received in said first locking arm.

4. The foldable frame member as claimed in claim 1, wherein said limit means comprises:

a positioning plate extending from said base plate of said first locking arm between said side plates at said second end of said first locking arm, said positioning plate being disposed adjacent to one side of said slots in said side plates of said first locking arm opposite to said first end of said first locking arm and having a threaded hole formed therethrough; and a threaded rod engaging threadedly said threaded hole and having a tip which abuts said retaining pin, said threaded rod being rotatable to adjust the position of said retaining pin in said slots in said side plates of said first locking arm when said second locking arm is received in said first locking arm.

5. The foldable frame member as claimed in claim 1, wherein said limit means comprises:

a positioning plate extending from said base plate of said first locking arm between said side plates at said second end of said first locking arm, said positioning plate being disposed adjacent to one side of said slots in said side plates of said first locking arm opposite to said first end of said first locking arm; and an eccentric ring secured on said retaining pin and having an outer periphery abutting said positioning plate.

6. The foldable frame member as claimed in claim 5, wherein said retaining pin has one end provided with a lever for rotating said retaining pin.

7. The foldable frame member as claimed in claim 5, wherein said outer periphery of said eccentric ring is formed with a plurality of angularly spaced convex protrusions, and said positioning plate is formed with a concave recess that engages releasably a selected one of said convex protrusions.

8. The foldable frame member as claimed in claim 1, wherein said side plates of said first locking arm has a pivot pin extending therebetween at said first end of said first locking arm, said one end of said second shaft being formed with a hook projection which engages pivotally and releasably said pivot pin to connect removably said first locking arm to said second shaft.

9. The foldable frame member as claimed in claim 1, wherein said limit means comprises:

a support pin extending between and mounted to said side plates of said first locking arm at said second end of said first locking arm, said support pin being disposed adjacent to one side of said slots of said side plates of said first locking arm opposite to said first end of said first locking arm and being formed with a radial hole;

a radial threaded bore formed in said retaining pin; and a threaded rod having a threaded shank portion that engages threadedly said threaded bore in said retaining pin, and a diameter-reduced shaft portion that extends through said radial hole in said support pin, said shank portion having one end abutting said support pin, said threaded rod being rotatable to adjust the position of said retaining pin in said slots in said side plates of said first locking arm when said second locking arm is received in said first locking arm.

10. The foldable frame member as claimed in claim 1, wherein:

said base plate of said first locking arm has an intermediate portion formed with a longitudinal guide hole and a positioning plate that extends from said base plate at one end of said guide hole and that is disposed between said side plates of said first locking arm adjacent to said slots;

said base plate of said second locking arm is formed with a longitudinal engaging hole that is aligned with said guide hole when said second locking arm is received in said first locking arm; and said locking unit further comprises a spring-loaded fastening unit including a fastening block disposed movably in said guide hole and a spring disposed between said fastening block and said positioning plate to bias said fastening block away from said positioning plate, said fastening block having a first block portion adjacent to said positioning plate and a second block portion which is narrower than said first block portion and which extends through said guide hole, said first block portion having one side opposite to said positioning plate formed with an inclined face, said first block portion extending through said engaging hole and having a bottom face which engages said base plate of said second locking arm to retain releasably said second locking arm in said first locking arm.

* * * * *